United States Patent [19]

Vanvoren et al.

[11] Patent Number: 4,778,278

[45] Date of Patent: Oct. 18, 1988

[54] PNEUMATIC SUSPENSION FOR VIBROCOMPACTORS WHICH ARE USED IN PARTICULAR FOR THE PRODUCTION OF CARBONACEOUS BLOCKS

[75] Inventors: Claude Vanvoren; Benoît Coste, both of St. Jean de Maurienne, France

[73] Assignee: Aluminium Pechiney, Paris, France

[21] Appl. No.: 60,489

[22] Filed: Jun. 11, 1987

[30] Foreign Application Priority Data

Jun. 16, 1986 [FR] France .................................. 86 08982

[51] Int. Cl.$^4$ ............................................. B01F 11/00
[52] U.S. Cl. .................................... 366/108; 164/203; 366/127; 425/421; 425/456
[58] Field of Search ............... 366/108, 110, 114, 116, 366/128, 127, 111, 208, 209, 219, 348, 349, 239; 425/253, 254, 255, 425, 456; 164/189, 196, 203; 99/277.2

[56] References Cited

U.S. PATENT DOCUMENTS 3,504,783 5/1970 Kuschnereit ......................... 366/108
4,596,469 6/1986 Huntsinger .......................... 366/219
4,600,046 7/1986 Bailey .................................. 366/114

Primary Examiner—Robert W. Jenkins
Attorney, Agent, or Firm—Dennison, Meserole, Pollack & Scheiner

[57] ABSTRACT

The invention relates to an apparatus of the vibrocompactor type for compacting carbonaceous blocks, and which comprises a vibrating table on which a carbonaceous paste is to be disposed, a heavy mass located below the table, and damper means located between the table and the mass for suspending the table above the mass. According to the invention, the damper means comprises inflatable pneumatic cushions. These cushions may be connected in parallel permanently to a source of fluid under a controllable pressure, or alternatively may be connected in parallel during the inflation of the cushions, and then isolated individually or in groups from the source of fluid. The apparatus may also include a means for measuring the pressure in each cushion or in a group of cushions, and a means for signalling the drop in pressure in each cushion or group.

14 Claims, 2 Drawing Sheets ced carbonaceous blocks

TECHNICAL FIELD OF THE INVENTION

The invention concerns a pneumatic suspension device for vibrocompactors, in particular but not exclusively those used for the production of carbonaceous electrodes for electrolysis tanks producing aluminium using the Hall-Héroult process, by electrolysis of alumina dissolved in molten cryolite.

STATE OF THE ART

Most modern installations for the production of aluminium using the Hall-Héroult process use prebaked anodes. Such anodes are produced by shaping at around 120° to 160° C. of a carbonaceous paste which is produced by mixing crushed coke and pitch at around 120° to 200° C.

The quality of the anodes plays an important part in satisfactory operation and in regard to economy of the process and operators are constantly seeking to improve the characteristics of the anodes, in particular by increasing their electrical conductivity (and therefore the total energy yield of the electrolysis operation) and their compactness and therefore their operating life. In fact, the operation of changing an anode is an operation which, even when mechanized and automated, is still a delicate one and causes local disturbances in the electrical and thermal equilibrium of the tank.

The process which is most widely used for shaping the anodes is vibrocompacting. That process may also be used for shaping other types of carbonaceous blocks: cathodic lining blocks for electrolysis tanks for Al or electrodes for siderurgical, electrometallurgical, and the like purposes.

The carbonaceous paste which issues from the mixer at a temperature of around 120° to 200° C. is introduced into the mould, the bottom of which is formed by a vibrating table and the walls of which can be at least partly removed for extraction of the finished carbonaceous block, while the top is formed by a heavy cover whose pattern, on the underneath surface (mould impression) causes shaping of the upper part of the anode: cut-off walls or corners, various groove configurations, sealing holes for the suspension rods.

The support table is caused to vibrate by a means which in most cases is formed by two rotary shafts with an eccentric out-of-balance member. The vibratory component is substantially vertical at a frequency of some tens of Hertz and at an amplitude which may be up to some tens of millimeters. The vibrating table is supported by a heavy mass of concrete by way of a certain number of springs.

DISADVANTAGES OF THE PRIOR ART

Suspending the vibrocompactor by means of springs is not entirely satisfactory. It is open in particular to the following objections:

(a) It is not controllable. In fact, in order to be able to adapt to variations in the weight of paste or mould, when manufacturing carbonaceous blocks of different formats on the same table, or to variations in the characteristics of the paste in respect of time, the operator can only vary the speed of rotation of the eccentric out-of-balance weights.

(b) It is not perfectly balanced, either because the springs are not of equal stiffness or height, in the original condition, or because their stiffness changes in different ways as they age.

(c) It does not give sufficient vibrational isolation relative to the environment.

SUBJECT-MATTER OF THE INVENTION

The subject-matter of the invention is a novel type of resilient suspension for vibrocompactors, which is based on the use of adjustable-pressure pneumatic cushions, partially or totally replacing the springs usually employed as suspension and vibration-damping elements, between the vibrating table and the concrete mass.

DESCRIPTION OF THE DRAWINGS

FIG. 1 shows the prior art and recalls the general structure of a vibrocompactor (in vertical section), FIG. 2 shows the same vibrocompactor fitted with pneumatic cushions according to the invention, FIG. 3 shows the detail of the mounting of a pneumatic cushion, FIG. 4 shows an alternative form of the invention in which a certain number of cushions are replaced by springs or resilient supports, and FIG. 5 shows the distribution of the cushions under the vibrating table (in a highly diagrammatic view).

Figure 1:
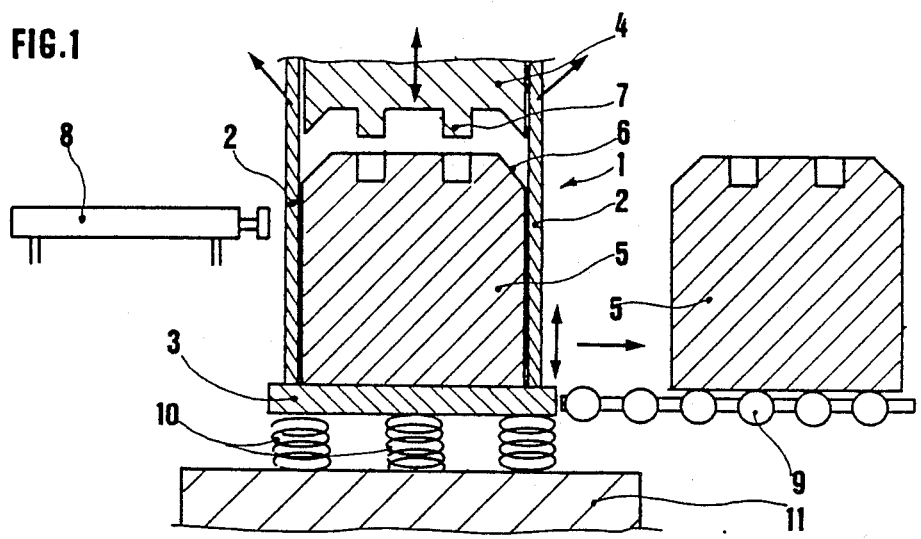
FIGS. 1 to 5 illustrate the way in which the invention is carried into effect.

The vibrocompactor 1 conventionally comprises a parallelepipedic mould formed by two removable transverse walls 2 and two longitudinal walls which cannot be seen in the sectional view. The mould bottom is formed by the vibrating table 3 itself which, under the effect of a motor coupled to two shafts with an eccentric out-of-balance weight, shown schematically as 3A, is subjected to a vibration with a substantially vertical component, at a frequency of 10 to 30 Hertz and with an amplitude which can be up to 40 millimeters. The natural frequency of vibration of the compacting machine is generally between 2 and 20 Hertz.

The cover 4 which is of relatively high weight (for example 2 to 4 tonnes) provides both for compacting of the carbonaceous weight by virtue of its inertia and shaping of the top of the anode 5: cut-off walls or corners 6, suspension rod sealing plugs 7, and various groove configurations.

After the moulding operation and then the lifting of the walls 2, the anode 5 is removed by means of the jack 8 in the direction of the roller table 9 towards the baking furnace or towards an intermediate storage location. The vibrating table 3 is supported by way of an assembly of coil springs 10 on a concrete mass 11 which is often itself isolated from the ground by a resilient suspension arrangement so as to reduce as much as possible transmission of vibration to the environment.

In accordance with the invention, the springs 10 are partially or entirely replaced by inflatable pneumatic cushions or tubes 12.

Figure 3:
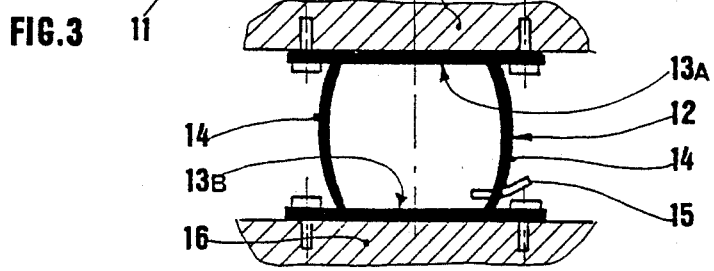
Figure 4:
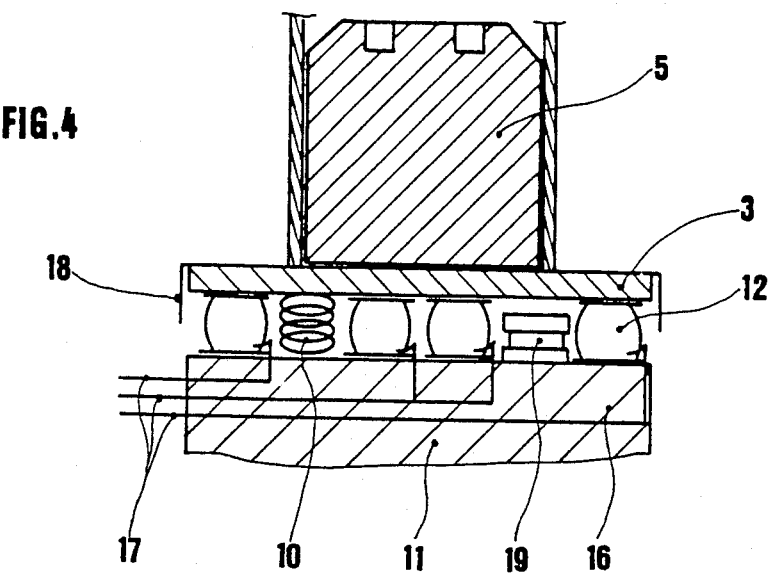

The embodiment illustrated in FIG. 3 uses cushions or tubes formed by two metal plates 13A and 13B which are connected by an elastomer diaphragm 14. The plates are provided with four screw-threaded metal inserts to provide for fixing thereof. One of the plates, being the plate 13B in the illustrated embodiment, has an inflation orifice 15. Plate 13B is mounted on lower frame structure 16 embedded in concrete mass 11.

Figure 2:
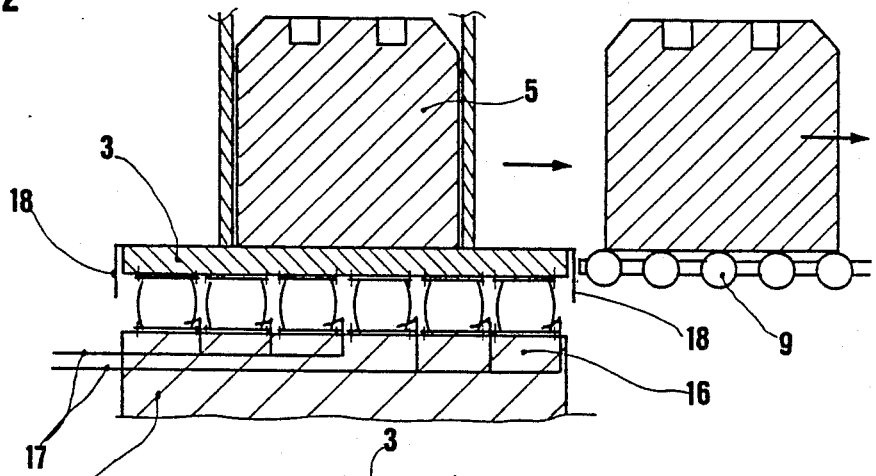

In the embodiment illustrated in FIG. 2, 24 springs have been replaced by 18 cushions.

For safety reasons, the fluid circuits of the cushions 12 are not all connected in parallel. It is preferably for them to be distributed in such a way as to connect them to the fluid source either individually or in the form of a plurality of groups which are supplied separately at a pressure of a few bars (2 to 8 bars for example, 0.2 to 0.8 MPa), with an array of distribution and isolating valves and with the option of parallel connection of the assembly in order to provide for simultaneous inflation to an identical pressure; the groups are then isolated. The pressure is monitored by manometers 22 which comprise a means for signalling any drop in pressure.

The cushions 12 are mounted with the inflation orifice 15 disposed at the side of the lower table so that the pneumatic circuit 17 is subjected to the minimum amount of vibration.

Taking account of the masses involved (10 to 30 tonnes) and the forces due to the vibrations, it is necessary to ensure the safety aspect of the vibrocompactor in the event of failure of the pneumatic cushions (accidental deflation or bursting).

In order to prevent general deflation, as indicated above, the assembly is divided into a plurality of groups. They are connected in parallel mode to an intermediate tank 26 during the inflation phase; thus, all the cushions are inflated to the same pressure.

The intermediate tank is connected to a source of pressure fluid such as a compressed air bottle 23.

When the cushions are inflated, the groups are isolated by operating electrically operated valves.

It is possible to envisage keeping the groups in parallel relationship during operation of the machine. In that case, the groups of cushions would be isolated only in the event of a leak which is detected by means of the pressure measuring instruments.

In addition, four proximity detectors 18 which are disposed at the four corners of the table react to any incipient collapse of the table 3 and automatically cut off rotation of the motor with the eccentric out-of-balance weights.

A certain number of resilient supports 19 are disposed between the two tables so as to limit the total collapse of the table 3 in the event of generalized deflation, thus ensuring that the cushions are not crushed under the weight of the vibrocompactor and the anode.

Finally it is possible to retain a certain number of springs 10 in addition to or to replace the resilient supports 19, still in order to avoid total collapse of the table 3.

It is also possible for an additional volume as indicated at 25 to be inserted between the electrically operated valve and the cushions, the aim thereof being to modify the overall volume of the cushions and consequently the stiffness thereof.

EXAMPLE OF USE

Based on the principles just described above, a vibrocompactor was equipped in accordance with the invention with 18 resilient cushions of type A113 produced by FIRESTONE, with a maximum diameter of 390 mm.

Figure 5:
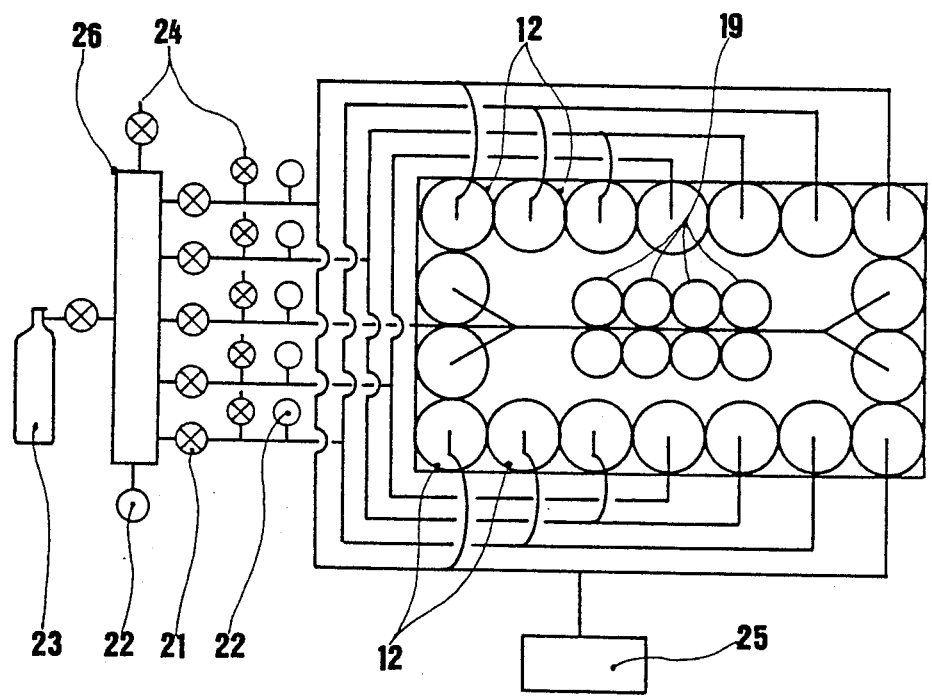

The 18 cushions are mounted on the periphery of the frame structure. They are inflated to a controllable pressure of between 0.4 and 0.8 MPa. From the point of view of compressed air feed, they are split up into four groups of four plus a group of two, which are disposed symmetrically (see FIG. 5).

As indicated above, the inflation orifices 15 are disposed at the lower table side. The cushions of each group are connected by tubes of polymer of polyamide type (such as "RILSAN"—registered trademark—) with brass connections. Each of the five groups is connected by way of valves 21 to the common intermediate tank 26 which is itself connected to the pressure fluid source by the valve 20. Those valves permit the following operations to be performed:

inflation in parallel of the whole of the cushions to a controlled pressure, isolation of the five groups of cushions, purging or partial deflation of a group of cushions independently of the others by means of the electrically operated purge valves 24.

The whole of the system can be connected to the compressed air network of the factory or to a compressor or to a bottle 23 of compressed gas or air, the volumes of air involved being relatively small.

At the centre of the table, eight resilient supports 19 covered by the trademark "PAULSTRA" would make it possible to prevent total collapse of the vibrocompactor and crushing of the cushions in the event of generalized deflation or bursting.

The total weight of the vibrocompactor being 13.5 tonnes (cover: 3.9 T, table+anode: 9.6 T), the load per cushion is 13.5/18=750 kg per cushion. The measured stiffness of the whole of the suspension is $15.8 \cdot 10^6$ Newtons per meter, that is to say $0.88 \cdot 10^6$ N/m per cushion inflated to 7 bars (0.7 MPa).

With the machine fitted in that way, two batches of anodes of different formats were produced.

The following Table shows the differences in characteristics between the anodes of those two batches and the anodes of two equivalent batches produced with the machine fitted with springs (fixed stiffness=$40 \cdot 10^6$ N/m).

|  | ANODE WEIGHT KG | COVER WEIGHT KG | STIFFNESS N/m | INCREASE IN DRY DENSITY (g/cm$^3$) RELATIVE TO THE PRIOR ART |
|---|---|---|---|---|
| BATCH A | 350 | 2200 | $12.7 \cdot 10^6$ | +0.015 |
| BATCH B | 690 | 4000 | $15.8 \cdot 10^6$ | +0.005 |

Dry density is defined as the apparent density multiplied by (100—pitch content %/100).

ADVANTAGES ACHIEVED BY THE INVENTION

Use of the invention makes it possible:

to be able easily to regulate the stiffness of the suspension arrangement by increasing or reducing the pressure to which the cushions are inflated. It is thus easier to adapt the stiffness thereof to a modification in the vibrating mass when manufacturing carbonaceous blocks of different formats, or to a variation in the raw materials;

to achieve better balancing of the machine. With the different cushions being connected in parallel, their inflation pressure is identical and the stiffness of the suspension arrangement is thus uniformly distributed;

to be able to detect the failure of a cushion by observing the pressure in the circuit; and to limit the transmission of vibrations to the outside (foundation block) by translating the transmittivity response peak towards low frequencies. Thus, the shock frequency occurs in an attenuation zone and not an amplification zone.

All those advantages are achieved without adversely affecting the compactness of the carbonaceous blocks produced.

What is claimed is:

1. In an apparatus of the vibrocompactor type for compacting carbonaceous blocks, comprising a vibrating table (3) on which a carbonaceous paste is to be disposed, means for causing said table to vibrate in a vertical direction, a heavy mass (11) located below and in generally parallel relationship to said table, and damper means (10) located between said table and said mass for suspending said table above said mass, the improvement comprising damper means comprising a plurality of inflatable pneumatic cushions (12), and means for simultaneously inflating said cushions to a substantially identical pressure, thereby maintaining the parallel relationship.

2. An apparatus according to claim 1, additionally comprising means for connecting each of said cushions in parallel permanently to a source of fluid at a controllable pressure.

3. An apparatus according to claim 1, additionally comprising means for connecting each of said cushions in parallel to a source of fluid for inflation of said cushions, and means for isolating said cushions, individually or in groups, from said source of fluid.

4. An apparatus according to claim 1, additionally comprising a means (22) for measuring the pressure in each cushion or in a group of cushions, and a means for signalling a drop in pressure in one cushion or in a group of cushions.

5. An apparatus according to claim 2, 3 or 4, additionally comprising electrically operated valves (21) for connecting each cushion or a group of cushions to source of fluid.

6. An apparatus according to claim 5, additionally comprising an intermediate tank (26) disposed between said valves (21) and a source of fluid.

7. An apparatus according to claim 1, 2, 3 or 4, additionally comprising means (18) for detecting collapse of said vibrating table (3) and means for interrupting the vibration of said table in the event of collapse.

8. An apparatus according to claim 1, 2, 3 or 4, additionally comprising auxiliary resilent means disposed between said vibrating table and said heavy mass so as to prevent collapse of said vibrating table in the event of deflation of the cusions.

9. An apparatus according to claim 8, wherein said auxiliary resilient means comprises at least one spring (10).

10. An apparatus according to claim 8, wherein said auxiliary resilient means comprises at least one resilient support (19).

11. An apparatus according to claim 1, 2, 3 or 4, additionally comprising means for connecting said cushions to a source of gaseous or liquid fluid which is at a controlled pressure.

12. An apparatus according to claim 11, wherein said fluid source comprises one or more additional auxiliary volumes (25).

13. An apparatus according to claim 1 used for the production of carbonaceous blocks for the production of aluminum by electrolysis.

14. In an apparatus of the vibrocompactor type for compacting carbonaceous blocks, comprising a vibrating table (3) on which a carbonaceous paste is to be disclosed, a heavy mass (11) located below said table, and damper means (10) located between said table and said mass for suspending said table above said mass, the improvement comprising damper means comprising a plurality of inflatable pneumatic cushions (12), means (18) for detecting collapse of said vibrating table (3) and means for interrupting the vibration of said table in the event of collapse.

* * * * *